UNITED STATES PATENT OFFICE.

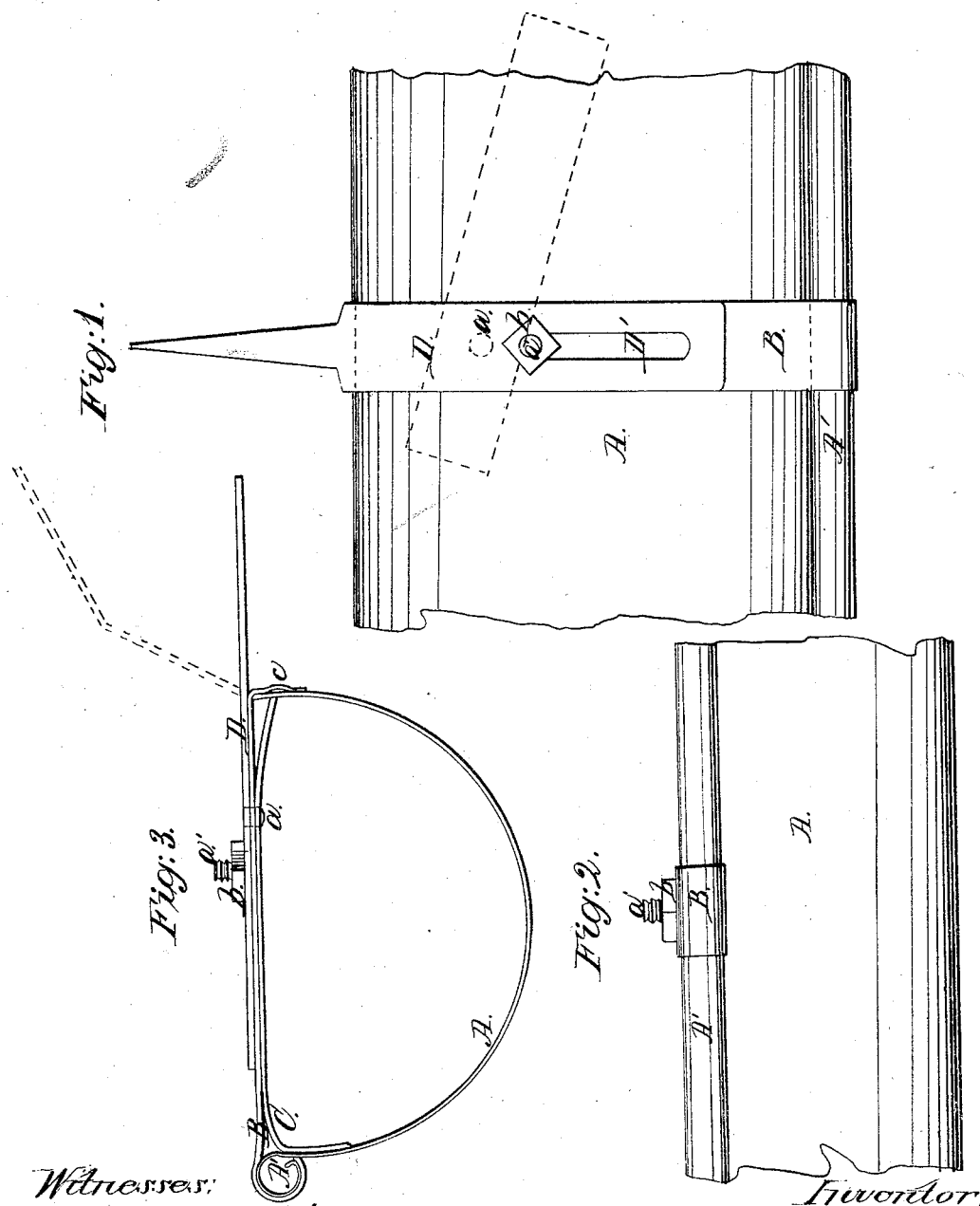

WILLIAM YAPP, OF CLEVELAND, OHIO.

IMPROVED EAVES-TROUGH.

Specification forming part of Letters Patent No. 57,813, dated September 4, 1866.

*To all whom it may concern:*

Be it known that I, WM. YAPP, of Cleveland, in the county of Cuyahoga and State of Ohio, have invented certain new and useful Improvements in Eaves-Trough Stays; and I do hereby declare that the following is a full and complete description of the same, reference being had to the accompanying drawings, making a part of this specification, in which—

Figure 1 is a top view. Fig. 2 is a front view. Fig. 3 is a side view.

Like letters of reference refer to like parts in the views.

A represents a portion of an eaves-trough; B, a brace, to which is attached the clamp C and arm D. The brace B is placed across the trough, as shown, forming a loop around the bead A' at the front of the trough. The other end of the brace is lapped over the side, in which lap B' is formed a concave, as shown at $c$ in Fig. 3, and when the clamp is turned round it presses the trough into this concave formed by the brace being bent, as shown. Thus there is no fear of its getting loose.

The clamp C is pivoted to the brace B at $a$. (Indicated by the dotted lines.)

After the brace is adjusted the clamp is turned round until it is parallel with the brace B, said brace and clamp being put onto the trough when the clamp is in the position shown by the dotted lines C'.

In the arm D is a slot, D', through which the screw $a'$ passes, said arm held in place by means of the nut $b$, which can be raised up or down on the screw $a'$, according to the inclination of the arm in fastening it to the roof. The end of the arm is spiked, as shown in Fig. 1, which is driven or screwed into the building.

If it is desired to fasten the arm to the roof instead of the side of the building, it can be bent in the form indicated by the dotted lines in Fig. 3.

By means of the screw $a'$ any desired pitch can be given to the trough for the purpose of carrying off the water.

This trough is very easily put up. The arm being driven into the building as far as necessary, the brace and clamp are put on the trough and the clamp turned, as stated, where it is held firmly between the two edges of the trough. The screw $b$, which is attached to the brace, is then passed up through the slot D' in the arm, and the nut $a'$ screwed on as far as desired. Thus the trough is fastened without much trouble and in a short time.

The support is composed of three pieces—brace, clamp, and arm—which can be cheaply and easily made out of ordinary sheet-iron.

What I claim as my improvement, and desire to secure by Letters Patent, is—

The brace B, with one end forming a loop and the other a lap, in which is formed a concave, $c$, in combination with the clamp C, pivot $a$, trough A, and arm D, in the manner and for the purpose substantially as set forth.

WM. YAPP.

Witnesses:
W. H. BURRIDGE,
J. HOLMES.